UNITED STATES PATENT OFFICE 2,518,194

PHOSPHATE GLASS

Alexander Silverman, Pittsburgh, Pa., Joseph J. Rothermel, Corning, N. Y., and Kuan-Han Sun, Wilkinsburg, Pa.

Application November 3, 1948, Serial No. 58,142

13 Claims. (Cl. 252—478)

This invention relates to phosphate glasses having high capacity for the absorption of short electromagnetic waves such, for example, as X and gamma rays.

The absorption coefficients for X-rays of the glasses that are commercially available are such that when used as a barrier against X-radiation a thickness about three times that of a protective lead shield is necessary to give equal protection. Another disadvantage of commercial X-ray glasses is that they discolor rather promptly under bombardment by X-rays. Although the brown discoloration may be removed by heat treatment, this is obviously objectionable and a disadvantage of such glasses.

A primary object of the present invention is to provide novel phosphate glasses that may be made readily from commonly available materials and which possess absorption coefficients for short electromagnetic waves, such as X-rays and gamma rays, that are much higher than those of previously available glasses whereby our glasses give better protection in thinner sections than was formerly possible.

A further object is to provide phosphate glasses in accordance with the foregoing object, which may be made colorless or any of a variety of colors, which may be transparent or opaque to visible light, and which under intense X-ray bombardment are stable against discoloration, or at least undergo color change at a greatly reduced rate as compared with the commercially available X-ray glasses.

Still another object is to provide such phosphate glasses which possess unusually high density and refractive indices.

Other objects will be recognized from the following specification.

Figure 1:
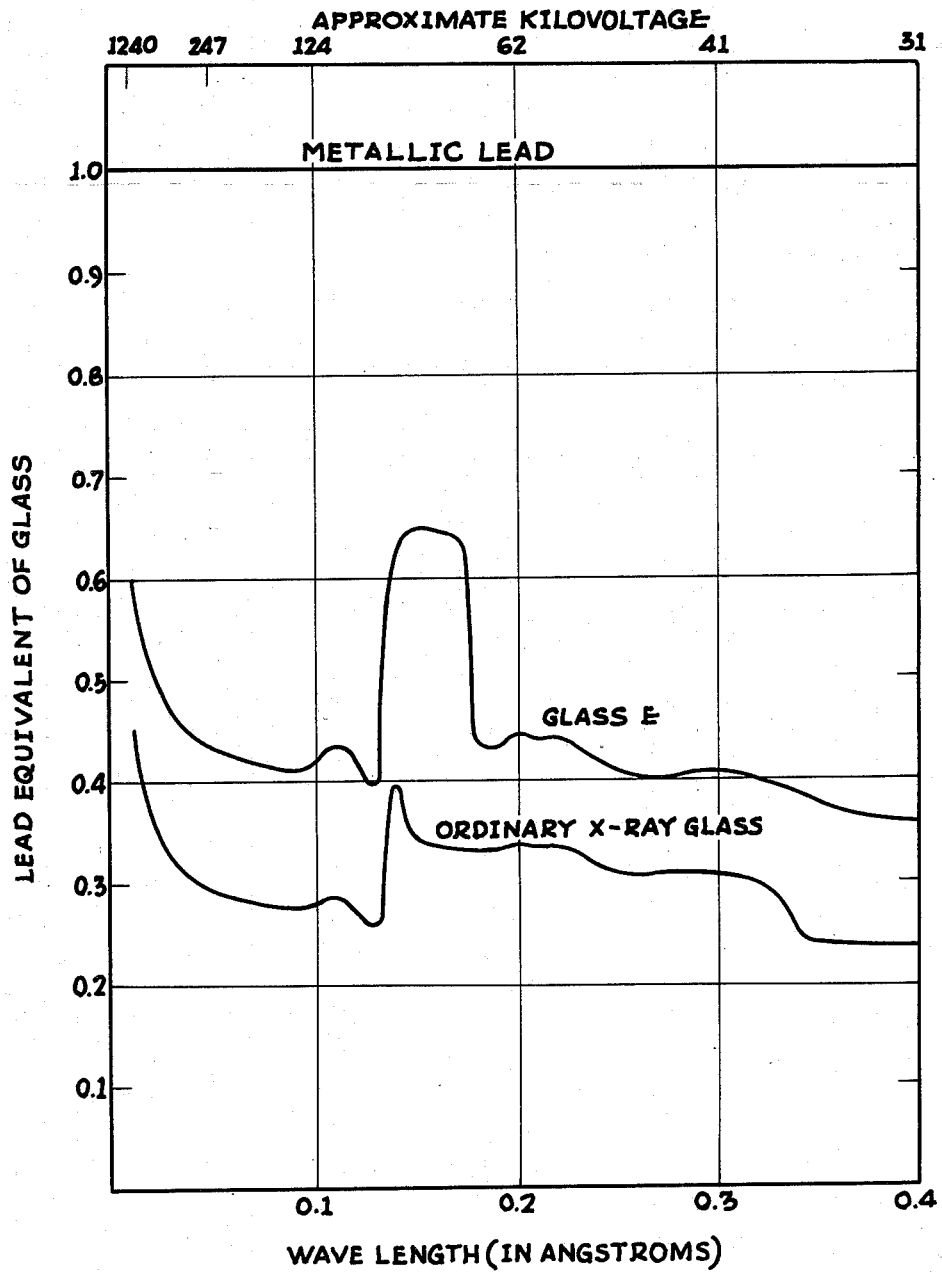
Figure 2:
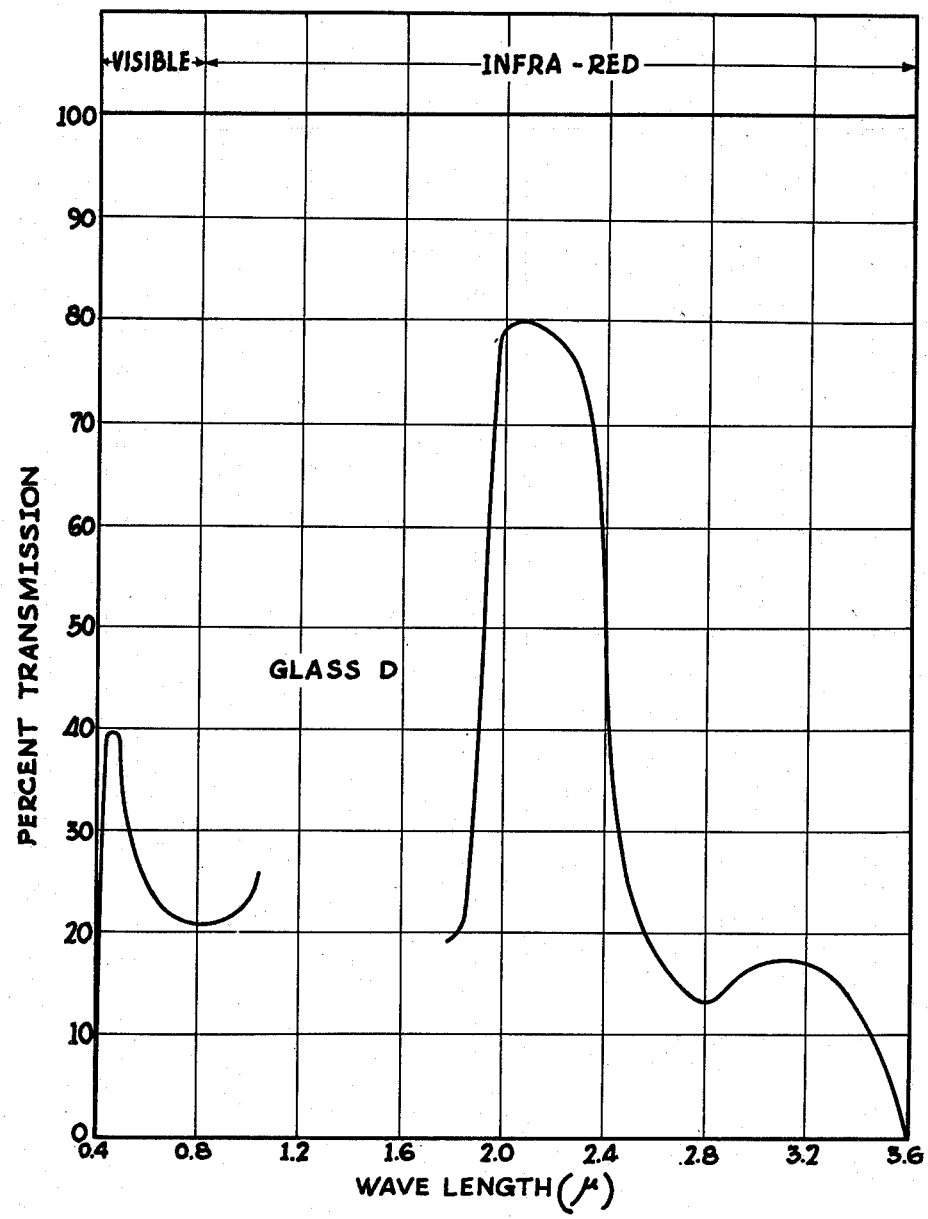

The invention will be described with reference to the accompanying drawings in which Fig. 1 shows graphs comparing the lead equivalent over a wide range of X-ray intensity of a typical commercially available X-ray glass and of a glass characteristic of the present invention; and Fig. 2 is a graph illustrating the spectral transmission in the visible and infra-red regions of another glass characteristic of our invention.

For the purposes of this invention phosphate glasses are vitreous fusion products of a phosphorus oxide and one or more metallic oxides. In the phosphate glasses known or proposed heretofore the metallic oxides have been chiefly those of the alkali metals, the alkaline earth metals, including beryllium and magnesium, and the oxides of zinc, manganese, boron, aluminum, silicon and titanium, with or without divalent lead oxide. In such known glasses other metallic oxides may or may not be present in amounts not exceeding 5 per cent by weight. Such known phosphate glasses have been intended for the absorption or transmission of particular spectral regions from the ultra violet to the infra-red, for luminescent effects, for matching the thermal expansion of other materials, for resistance to special chemical agents such as hydrofluoric acid or vapors of alkali metals, for particular water solubility relations, or for low optical dispersion, and they do not possess properties rendering them suited for protection against X-rays.

We have discovered, and it is upon this that our invention is in large part predicated, that the foregoing objects are attained with phosphate glasses which contain in addition to phosphorus oxide (which in these glasses corresponds to the silica of ordinary glasses) at least one oxide of a hexavalent metal, such as molybdenum and tungsten, and at least one oxide of the group consisting of bismuth and lead. These novel glasses are unique in that they possess unusually high absorption coefficients for X-rays and other short electromagnetic waves, such as gamma rays. In fact, glasses in accordance with this invention need be only about 1.75 times as thick as a metallic lead barrier to give equal protection. Consequently, glass shields for protection against X-rays may be made much thinner, and correspondingly lighter in weight, than has been possible with the previously available X-ray glasses. A further advantage is that our novel phosphate glasses do not discolor so that heat treatment to destroy discoloration is rendered unnecessary, or, if they do discolor under intense or long continued X-radiation exposure the change occurs at a rate that is only a fraction of that encountered in the X-ray glasses that are now commercially available. Furthermore, by appropriate combinations of the elements that characterize our invention we can supply glasses that are colorless or possess any of a variety of colors and which are either transparent or opaque to spectral regions in the visible and infra-red regions of the spectrum. Our glasses are further characterized by unusually high density and refractive indices that are either novel, or are unique from an optical point of view.

Although a common mode of expressing compositions is in weight per cent, we prefer to describe the glasses of our invention on the basis sodium, strontium, tantalum, thallium, thorium, titanium, uranium, zinc and zirconium.

The following compositions, in which the proportions are on the weight and cationic percentage basis, exemplify glasses in accordance with our invention, not only from the standpoint of composition but also with respect to the color of our novel glasses:

|  | Class A | | Class B | | Class C | | Class D | | Class E | |
|---|---|---|---|---|---|---|---|---|---|---|
|  | Weight Per Cent | Cat. Per Cent | Weight Per Cent | Cat. Per Cent | Weight Per Cent | Cat. Per Cent | Weight Per Cent | Cat. Per Cent | Weight Per Cent | Cat. Per Cent |
| $MoO_3$ | 35 | 30 |  |  |  |  |  |  |  |  |
| $WO_3$ |  |  | 24.2 | 15 | 61.6 | 40 | 42.2 | 30 | 21.3 | 15 |
| PbO | 36.2 | 20 |  |  | 14.8 | 10 | 40.6 | 30 | 60 | 44 |
| $Bi_2O_3$ (or $BiO_{1.5}$) |  |  | 48.6 | 30 |  |  |  |  |  |  |
| $P_2O_5$ (or $PO_{2.5}$) | 28.8 | 50 | 27.2 | 55 | 23.6 | 50 | 17.2 | 40 | 16.1 | 37 |
| $MO_x$ [1] |  |  |  |  |  |  |  |  | 2.6 | 4 |
| Color | Extremely dark (Greenish). | | Blue | | Opaque to visible but transparent to infrared. | | Blue | | Almost colorless. | |

[1] Minor oxides, i. e., CdO and $TiO_2$.

of cationic per cent, i. e., in terms of the relative number of positive atoms, or "cations," which basis has significant meaning. Thus, the cationic per cent of an oxide in a glass is the same as its molecular or formula percentage when all of the oxides are expressed in terms of the simple empirical formula $RO_x$, where R is always unity and $x$ varies as the case may be. For example, the oxides $Na_2O$, CaO, $B_2O_3$, $SiO_2$, $P_2O_5$ and $WO_3$ are expressed on the cationic basis as $NaO_{0.5}$, CaO, $BO_{1.5}$, $SiO_2$, $PO_{2.5}$ and $WO_3$. This system of notation affords a simple and logical substitution and comparison of one cation for another, and it has identical significance with the conventional mode of identifying oxides, which is likewise empirical.

More in detail, the glasses provided by our invention contain at least 5 cationic per cent (6 per cent by weight) of at least one oxide of a hexavalent element and at least 5 cationic per cent (7 per cent by weight) of at least one element of the group consisting of bismuth and lead, with the remainder substantially all phosphorus oxide. In the preferred embodiment the hexavalent metal oxides are those of molybdenum ($MoO_3$) and tungsten ($WO_3$) and the glasses may contain from about 5 to 50 cationic per cent (6 to 67 per cent by weight) of $MoO_3$ or from about 5 to 63 cationic per cent (7 to 84 per cent by weight) of $WO_3$, it being understood that the glass may contain one or both of those oxides. Preferably the glasses contain from about 5 to 33 cationic per cent (7 to 50 per cent by weight of $Bi_2O_3$) of bismuth oxide as $BiO_{1.5}$, or from 10 to 52 cationic per cent (12 to 70 per cent by weight) of lead oxide as PbO, and here again either or both of these oxides may be present. In this preferred embodiment the phosphorus oxide, as $PO_{2.5}$, constitutes about 30 to 85 cationic per cent (13 to 64 per cent by weight of $P_2O_5$) and makes up substantially all of the remainder of the glass.

Of course, the glasses may contain amounts of other oxides that do not adversely affect the properties that characterize the glasses of our invention. Thus, they may contain up to a total of about 5 per cent of minor oxides, which term is used hereinafter to designate, for brevity, those of aluminum, boron, beryllium, barium, cadmium, columbium, germanium, indium, lanthanum, lithium, magnesium, potassium, silicon, All of our glasses have, to repeat, exceptionally high absorption coefficients toward such short electromagnetic waves as X-rays and gamma rays. Particularly, those containing large amounts of bismuth and lead, either or both, supplemented by relatively large amounts of tungsten, have exceedingly high values for that absorption coefficient, together with similarly high values for density and refractive index. As exemplifying this, reference is made to Fig. 1 which compares the X-ray absorption power from 30 kv. to 1240 kv. of the foregoing glass E with that of a typical commercially available X-ray glass, relative to metallic lead of equal thickness taken as unity (the so-called lead equivalent). The markedly superior absorption ability of glass E for X-rays for short wave radiation is perfectly evident from these graphs.

As appears from the foregoing table, glass E is virtually colorless, whereas glasses A, B and D are, respectively, dark greenish, royal blue and blue. In general, the glasses containing molybdenum may be made green or colorless depending on their composition and the atmospheric condition prevailing during their manufacture, while those containing tungsten may similarly be made blue, green, yellow or colorless. Those containing large amounts of bismuth and lead, either or both, together with relatively large amounts of tungsten are usually colorless or slightly yellowish, and they have a sharp cutoff near the visible range of the spectrum on the ultra violet side at about 400 m$\mu$. The glasses containing very high amounts of molybdenum or tungsten, such as glasses A and C, may be made opaque to visible light yet transparent to infrared radiation with a maximum transmission at about 2.2 and 2.5 m$\mu$. With suitable amounts of tungsten and lead, as exemplified by glass D, there is provided a unique pale blue glass with a selective absorption of visible and infra-red radiation, as shown in Fig. 2.

In addition, and as indicated above, the present invention supplies glasses that do not become discolored under intense X-ray bombardment, and although some of the compositions falling within the invention may become discolored, the change takes place much more slowly than is the case with the X-ray glasses available commercially prior to our invention.

The characteristic properties of our glasses are likewise unique as evidenced by the following examples:

|  | Glass C | Glass D | Glass E |
|---|---|---|---|
| Density (g./ml.) | 4.988 | 6.030 | 6.583 |
| Refractive Index (D-line) | 1.8 | 1.9 | 1.993 |
| Abbé Value |  |  | 21.9 |
| Lead Equivalent (100 kv. X-rays) | 0.333 | 0.473 | 0.578 |

These data show that our glasses are characterized by very high density, Abbé value and refractive index for the D-line. They also exhibit relatively low dispersion. Generally speaking, the minimum values for density, refractive index and lead equivalent toward 100 kv. X-rays may be taken as, respectively, 3.0, 1.6 and 0.33, although the foregoing data show that generally speaking these values are substantially higher. As a general rule our new glasses are likewise durable against atmospheric moisture attack.

These glasses are made, as will be understood, by fusion methods. In their preparation any compound which yields the desired component in free or combined form may be used in the batch. For example, the phosphorus and lead oxides may be supplied by ordinary orthophosphoric acid ($H_3PO_4$) and red lead ($Pb_3O_4$), or both may be supplied by certain lead phosphates. Preferably in preparing the batch the solid compounds such as oxides of bismuth, molybdenum, tungsten, and lead, and compounds supplying those oxides in the finished glass, are gradually added to phosphoric acid of suitable concentration, whereupon an exothermic reaction usually occurs and a uniform mass results after evaporation. The latter is transferred to a liquid-tight vessel made from platinum, fused silica, high silica glass, or sillimanite, which is then placed in an electric furnace or a gas fired muffle furnace and heated at an appropriate temperature. The melting temperatures may range from about 700° to 1350° C., depending on the composition. High content of phosphorus oxide tends to lower the melting temperature, while the reverse effect is generally produced by high content of molybdenum oxide or tungsten oxide. Lead oxide and bismuth oxide generally exert intermediate effects upon the melting temperature. Of course, in the short time melting of larger amounts of batch, higher temperatures are required. As an example, several pounds of glass E may be melted in an hour at about 1200° C. After the batch has become liquid the temperature is lowered somewhat and the molten glass is stirred thoroughly and then poured into a previously heated mold of desired form and cooled slowly to room temperature in a temperature controlled muffle furnace, whereby to avoid cracking due to the creation of cooling strains. As a general rule the temperature of the mold and of the furnace into which it is placed will range from about 150° to 600° C. although it will depend also in part upon the composition of the glass and the size of the molded piece. For glass E a few centimeters thick, a temperature of 400° C. is used.

Instead of using phosphoric acid in the batch dry phosphate compounds such as dihydrogen ammonium phosphate might be used but this may render the control of color difficult, and the preparation of chemically and physically homogenous batches is much easier using phosphoric acid, as described above, which practice is accordingly preferred.

According to the provisions of the patent statutes, we have explained the principle and mode of compounding of our invention and have illustrated and described what we now consider to represent its best embodiment. However, we desire to have it understood that, within the scope of the appended claims, the invention may be practiced otherwise than as specifically illustrated and described.

We claim:

1. A phosphate base glass consisting essentially of by weight, 21 per cent of $WO_3$, 60 per cent of PbO, 16 per cent of $P_2O_5$, and about 3 per cent total "minor oxides."

2. A phosphate glass according to claim 1, said "minor oxides" being at least one member of the group consisting of cadmium oxide (CdO) and titanium dioxide ($TiO_2$).

3. Glass according to claim 1, the glass being almost colorless, and having a lead equivalent of about 0.6 for 100 kv. X-rays, an Abbé value of about 22, a refractive index of about 1.99, and a density of about 6.58 g./ml.

4. A phosphate base glass consisting essentially of, by weight, 42 per cent of $WO_3$, 41 per cent of PbO, and 17 per cent of $P_2O_5$, and the glass being blue and having a lead equivalent for 100 kv. X-rays of about 0.47, a density of about 6.03 g./ml., and a refractive index of about 1.9.

5. A phosphate base glass consisting essentially of, by weight, about 6 to 85 per cent of at least one hexavalent metallic oxide of the group consisting of $MoO_3$ and $WO_3$, 7 to 70 per cent of at least one oxide of the group consisting of lead ($Pb^{II}$) and bismuth ($Bi^{III}$), and the remainder substantially all phosphorus oxide as $P_2O_5$ with not more than about 5 per cent of "minor oxides."

6. A phosphate base glass consisting essentially of, by weight, about 6 to 67 per cent of $MoO_3$, 7 to 70 per cent of at least one oxide of the group consisting of lead ($Pb^{II}$) and bismuth ($Bi^{III}$), and the remainder substantially all phosphorus oxide as $P_2O_5$ with not more than about 5 per cent of "minor oxides."

7. A phosphate base glass consisting essentially of, by weight, about 7 to 85 per cent of $WO_3$, about 7 to 70 per cent of at least one oxide of the group consisting of lead ($Pb^{II}$) and bismuth ($Bi^{III}$), and the remainder substantially all phosphorus oxide as $P_2O_5$ with not more than about 5 per cent of "minor oxides."

8. A phosphate base glass consisting essentially of, by weight, about 6 to 85 per cent of at least one hexavalent oxide of the group consisting of $MoO_3$ and $WO_3$, about 7 to 70 per cent of lead oxide as PbO, and the remainder substantially all phosphorus oxide as $P_2O_5$ with not more than about 5 per cent of "minor oxides."

9. A phosphate base glass consisting essentially of, by weight, about 6 to 65 per cent of at least one hexavalent oxide of the group consisting of $MoO_3$ and $WO_3$, about 7 to 50 per cent of bismuth oxide as $Bi_2O_3$, and the remainder substantially all phosphorus oxide as $P_2O_5$ with not more than about 5 per cent of other oxides.

10. A phosphate base glass consisting essentially of at least one oxide of the group consisting of 6 to 67 per cent of $MoO_3$ and 7 to 84 per cent of $WO_3$, at least one oxide of the group consisting of 7 to 50 per cent of $Bi_2O_3$ and 12 to 70 per cent of PbO, 13 to 64 per cent of $P_2O_5$, and not more than about 5 per cent total "minor oxides," and the glass having a lead equivalent for 100 kv. X-rays greater than 0.33.

11. A glass according to claim 10, said glass having a refractive index of at least 1.6.

12. A glass according to claim 10, said glass also having a density of at least 3 g./ml.

13. A phosphate base glass consisting essentially of at least one oxide of the group consisting of 6 to 67 per cent of $MoO_3$ and 7 to 84 per cent of $WO_3$, at least one oxide of the group consisting of 7 to 50 per cent of $Bi_2O_3$ and 12 to 70 per cent of PbO, 13 to 64 per cent of $P_2O_5$, and not more than about 5 per cent total "minor oxides," the glass having a lead equivalent for 100 kv. X-rays greater than 0.33, and being colored and having maximum transmission at about 0.48, 2.2 and 2.5 m$\mu$.

ALEXANDER SILVERMAN.
JOSEPH J. ROTHERMEL.
KUAN-HAN SUN.

No references cited.